E. W. SCOTT.

Whip-Sockets.

No. 5,400.

Reissued May 6, 1873.

Witnesses

Walter R Scott.

L. F. Scott.

Mahlon S. Drake

Joseph M. Parcells.

Inventor

Erastus W. Scott

Anson Searls and

Erastus W. Scott Assignees

THE NORRIS PETERS CO., PHOTO-LITHO., WASHINGTON, D. C.

UNITED STATES PATENT OFFICE.

ERASTUS W. SCOTT, OF WAUREGAN, CONNECTICUT, ASSIGNOR TO HIMSELF AND ANSON SEARLS, OF NEWARK, NEW JERSEY.

IMPROVEMENT IN WHIP-SOCKETS.

Specification forming part of Letters Patent No. 70,627, dated November 5, 1867; reissue No. 5,400, dated May 6, 1873; application filed January 16, 1873.

*To all whom it may concern:*

Be it known that I, ERASTUS W. SCOTT, of Wauregan, in the county of Windham and State of Connecticut, have invented certain new and useful Improvements in Whip-Sockets, which are simple in construction, efficient in operation, and durable in use; and the improvements consist in the use of a lever with the stationary or upright portion of the socket, and in the construction and combination of the parts, as hereinafter more fully described; and I do hereby declare that the following is a full, clear, and exact description thereof, which will enable others skilled in the art to which it appertains to make and use the same, reference being had to the accompanying drawing, with letters of reference marked thereon, forming a part of this specification, in which—

Figure 1:
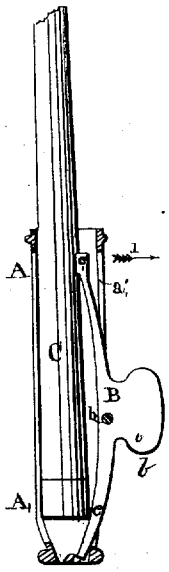
Figure 2:
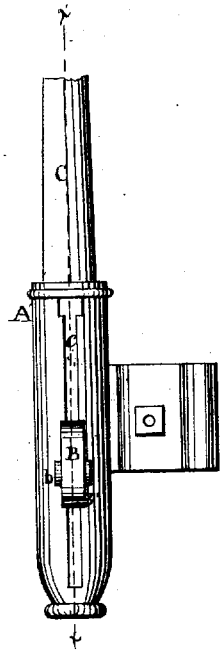

Figure 1 is a central vertical section, taken on line *x x* of Fig. 2, of a socket embodying my invention; and Fig. 2 is an elevation of the same.

A represents a tubular socket provided with a suitable flange at the top, and the interior of the bottom part of the socket gradually decreases in size, being constructed in a partially cone form, as shown. The socket A is provided with a suitable fastener for the purpose of securing the same to the carriage. The socket A is provided with a slot, *a'*, extending a sufficient distance to admit the lever B, which is suitably pivoted to the part A in such a manner as to move on its pivot, for a purpose presently described. This lever B extends upward and downward from its pivot and inclines or curves inward from the pivot to each end, so that each end of the lever, or a point near each end of the lever, forms a bearing-point for the whip C when inserted in the socket, while the opposite side of the whip-stock C bears upon the socket A, as shown in Fig. 1. The lever B is pivoted to the socket A at a point inside of its center of gravity, so that when the whip is removed the upper part of the lever automatically moves outward, as indicated by the arrow, leaving the top of the socket open for the reception of the whip. The same outward movement of the top of the lever would be caused by the butt of the whip when withdrawn from the socket.

The operation is as follows: The whip C being removed from the socket, the upper part of the lever falls outward, as above described, leaving the top of the socket open. The whip then, being again inserted in the socket, first comes in contact with the lower inclined or curved part *e* of the lever B, and as the whip passes down the lower part *e* of the lever is pressed outward, which action brings the upper part *c* inward until it is brought to bear firmly against the whip C, and thus holding the whip securely between the lever and the opposite side of the socket A.

By this means a whip of any ordinary size may be firmly and securely held in position.

Having thus fully described the invention, what is claimed, and desired to be secured by Letters Patent, is—

1. The combination of the stationary part of a whip-socket and a lever, the lever being hinged or pivoted so that the lever bears against the whip at or near the ends of the lever, to hold the whip in position, for the purpose set forth.

2. The lever B, curved or inclined inward from its point of pivot, and used in connection with the stationary part A, substantially as and for the purpose specified.

3. The lever B pivoted at a point inside of its center of gravity, so that when left free the upper part of the lever will fall outward, substantially as and for the purpose set forth.

ERASTUS W. SCOTT.

Witnesses:
WM. DYER,
SARAH J. DYER.